(12) United States Patent
Rosen et al.

(10) Patent No.: US 11,209,715 B2
(45) Date of Patent: Dec. 28, 2021

(54) TUNABLE FRESNEL LENS WITH IMPROVED IMAGE QUALITY

(71) Applicant: Optica Amuka (A.A.) Ltd., Petach Tikva (IL)

(72) Inventors: Shamir Rosen, Ramat Gan (IL); Yariv Haddad, Raanana (IL); Yuval Vardy, Tel Aviv (IL); Yoav Yadin, Ganey Tikva (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 0 days.

(21) Appl. No.: 16/772,827

(22) PCT Filed: Jan. 1, 2019

(86) PCT No.: PCT/IB2019/050007
§ 371 (c)(1),
(2) Date: Jun. 15, 2020

(87) PCT Pub. No.: WO2019/135168
PCT Pub. Date: Jul. 11, 2019

(65) Prior Publication Data
US 2021/0173282 A1 Jun. 10, 2021

Related U.S. Application Data

(60) Provisional application No. 62/614,510, filed on Jan. 8, 2018.

(51) Int. Cl.
*G02B 27/42* (2006.01)
*G02F 1/29* (2006.01)
*G02B 5/28* (2006.01)

(52) U.S. Cl.
CPC ............ *G02F 1/294* (2021.01); *G02B 5/28* (2013.01); *G02F 2203/055* (2013.01)

(58) Field of Classification Search
CPC ...... G02F 1/294; G02F 2203/055; G02B 5/28
See application file for complete search history.

(56) References Cited

U.S. PATENT DOCUMENTS 5,999,147 A 12/1999 Teitel
7,475,985 B2 1/2009 Blum et al.
(Continued)

FOREIGN PATENT DOCUMENTS

WO 2014049577 A1 4/2014
WO 2015136458 A1 9/2015
WO 2017182906 A1 10/2017

OTHER PUBLICATIONS

Afsoon Jamali et al. "Design of a large aperture tunable refractive Fresnel liquid crystal lens", vol. 57, No. 7 / Mar. 1, 2018 /Applied Optics.*
(Continued)

*Primary Examiner* — Hoan C Nguyen
(74) *Attorney, Agent, or Firm* — Kligler & Associates Patent Attorneys Ltd

(57) ABSTRACT

Optical apparatus includes a Fresnel lens (40), including an array of refractive bands (37) bordered by abrupt phase steps (39) of a height selected so as to focus light in different, first and second wavelength ranges from an object plane (35) toward an image plane (36) with a modulation transfer function (MTF) in excess of a predefined threshold, while focusing light in a third wavelength range, intermediate the first and second wavelength ranges, with MTF less than the predefined threshold. A display (32) is configured to generate, at the object plane of the Fresnel lens, an image including first and second pixel colors within the first and second wavelength ranges, respectively.

32 Claims, 5 Drawing Sheets

(56) References Cited

U.S. PATENT DOCUMENTS

| | | | |
|---|---|---|---|
| 8,100,527 B2* | 1/2012 | Hong | A61F 2/1602 |
| | | | 351/159.05 |
| 10,036,901 B2 | 7/2018 | Yadin et al. | |
| 10,451,947 B1* | 10/2019 | Lu | G06F 1/1694 |
| 11,022,835 B2* | 6/2021 | Jamali | G06F 3/013 |
| 2005/0231677 A1 | 10/2005 | Meredith | |
| 2007/0002444 A1 | 1/2007 | Piers et al. | |
| 2013/0063691 A1 | 3/2013 | Takama et al. | |
| 2013/0286309 A1* | 10/2013 | Valley | G02F 1/137 |
| | | | 349/35 |
| 2015/0212245 A1* | 7/2015 | Ueda | G02B 5/285 |
| | | | 359/588 |
| 2015/0277151 A1 | 10/2015 | Yadin et al. | |
| 2017/0208320 A1* | 7/2017 | Suzuki | H04N 13/31 |
| 2019/0049752 A1* | 2/2019 | Van Heugten | G02B 3/08 |
| 2019/0243209 A1* | 8/2019 | Perreault | G02B 26/106 |

OTHER PUBLICATIONS

International Application PCT/IB2019/050007 Search Report dated Apr. 29, 2019.

* cited by examiner

TUNABLE FRESNEL LENS WITH IMPROVED IMAGE QUALITY

CROSS-REFERENCE TO RELATED APPLICATION

This application claims the benefit of U.S. Provisional patent Application 62/614,510, filed Jan. 8, 2018, which is incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications. For example, U.S. Pat. No. 7,475,985 describes the use of an electro-active lens for the purpose of vision correction.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

PCT International Publication WO 2014/049577, whose disclosure is incorporated herein by reference, describes an optical device comprising an electro-optical layer, such as a liquid crystal layer, having an effective local index of refraction at any given location within an active area of the electro-optical layer that is determined by a voltage waveform applied across the electro-optical layer at the location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

PCT International Publication WO 2015/136458, whose disclosure is incorporated herein by reference, describes improved electrically-tunable optical devices and control voltage waveforms used in driving such devices. In one embodiment, the control voltage waveforms are selected so as to cause the device to function as a Fresnel lens. The implementation of such an electrically-tunable Fresnel lens is described, for example, on pages 25-27 of this publication and illustrated in FIG. 15.

SUMMARY

Embodiments of the present invention that are described hereinbelow provide improved electrically-tunable optical devices and methods for their operation and use.

There is therefore provided, in accordance with an embodiment of the invention, optical apparatus, including a Fresnel lens, which includes an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold. A display is configured to generate, at the object plane of the Fresnel lens, an image including first and second pixel colors within the first and second wavelength ranges, respectively.

In some embodiments, the image generated by the display does not have any pixel colors within the third wavelength range.

In some embodiments, the Fresnel lens includes an electro-optical medium and electrodes configured to apply varying electrical potentials across the electro-optical medium so as to adjust focal properties of the Fresnel lens. In a disclosed embodiment, the electrodes include an array of excitation electrodes, which include parallel conductive stripes extending along respective, mutually-parallel axes across at least a first side of the electro-optical medium, and the electro-optical medium includes a liquid crystal. In one embodiment, the varying electrical potentials are adjustable so as to match the first and second wavelength ranges to the first and second pixel colors.

Alternatively or additionally, the first and second pixel colors are selected to match the first and second wavelength ranges.

In one embodiment, the display includes at least first pixels configured to emit light of the first pixel color and second pixels configured to emit light of the second pixel color.

In a disclosed embodiment, the height of the phase steps is selected so that the Fresnel lens further focuses light in a fourth wavelength range with MTF in excess of the predefined threshold, wherein the fourth wavelength range is separated from the first and second wavelength ranges by another range with MTF less than the predefined threshold, and wherein the image generated by the display includes a third pixel color within the fourth wavelength range.

There is also provided, in accordance with an embodiment of the invention, optical apparatus, including a Fresnel lens, including an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold. A multi-band filter is interposed between the object plane and the image plane and has first and second passbands, which overlap respectively with the first and second wavelength ranges, and a stopband intermediate the first and second passbands, overlapping with the third wavelength range.

In some embodiments, the multi-band filter includes a multi-layer interference filter. In one such embodiment, the height of the phase steps is graduated over an area of the Fresnel lens responsively to a shift of the first and second passbands with an angle of incidence of the light on the multi-layer interference filter. Typically, the height of the phase steps is greater in a central part of the Fresnel lens than in a peripheral part of the Fresnel lens.

In some embodiments, the Fresnel lens includes an electro-optical medium and electrodes configured to apply varying electrical potentials across the electro-optical medium so as to adjust focal properties of the Fresnel lens. In one embodiment, the varying electrical potentials are adjustable so as to match the first and second wavelength ranges to the first and second passbands.

Additionally or alternatively, the first and second passbands are selected to match the first and second wavelength ranges.

There is additionally provided, in accordance with an embodiment of the invention, an optical method, which includes providing a Fresnel lens, including an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold. An image is generated, at the object plane of the Fresnel lens, including first and second pixel colors within the first and second wavelength ranges, respectively.

There is further provided, in accordance with an embodiment of the invention, an optical method, which includes providing a Fresnel lens, comprising an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold. A multi-band filter having first and second passbands, which overlap respectively with the first and second wavelength ranges, and a stopband intermediate the first and second passbands, overlapping with the third wavelength range, is interposed between the object plane and the image plane. The present invention will be more fully understood from the following detailed description of the embodiments thereof, taken together with the drawings in which:

DETAILED DESCRIPTION OF EMBODIMENTS

Overview

Figure 1:
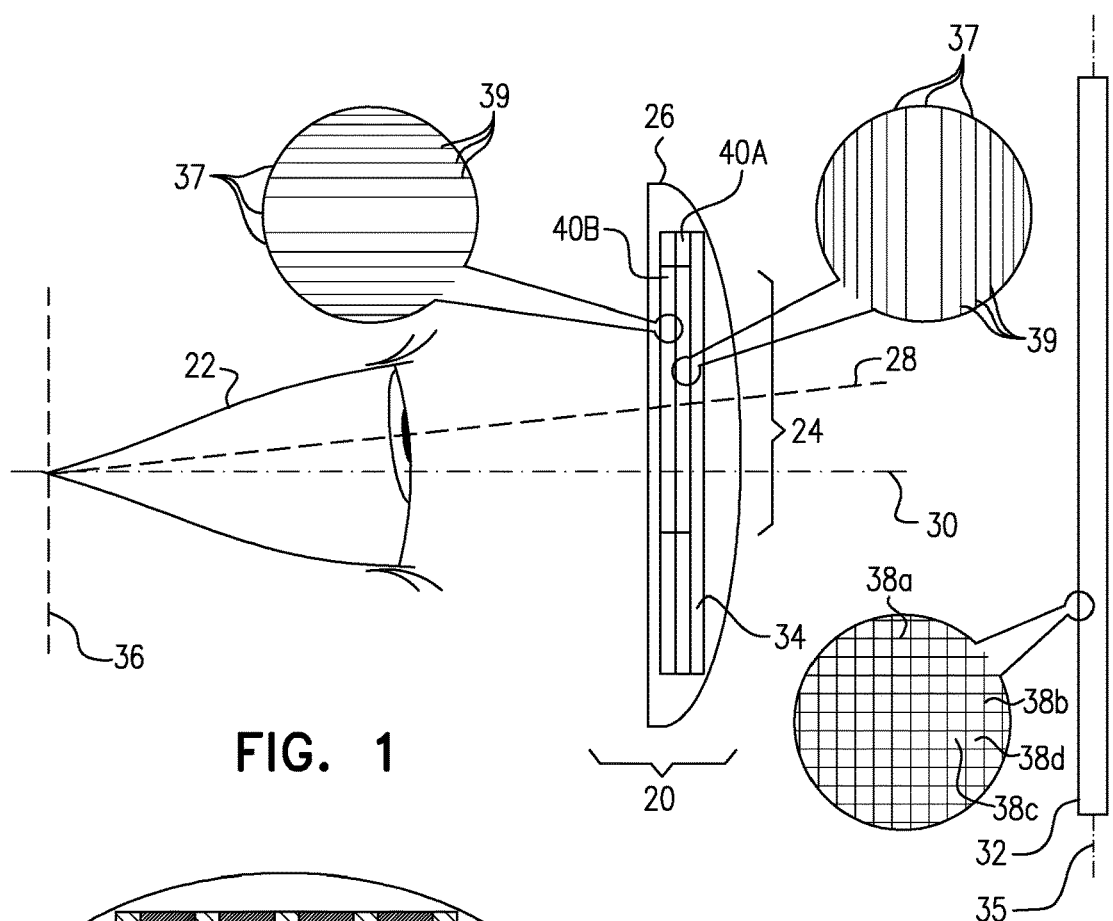
FIG. 1 is a schematic sectional view of a tunable ophthalmic lens, in accordance with an embodiment of the present invention.

Tunable lenses offer major advantages over conventional static lenses in ophthalmic use. For example, tunable spectacle lenses can dynamically adjust their focal lengths for different object distances, as an aid to individuals who have lost their natural ability to accommodate for distance due to presbyopia or aphakia. Tunable spectacle lenses can also adjust their optical power to compensate for eye fatigue and different lighting conditions and can even be shared by different people with different prescriptions. The above-mentioned PCT International Publications WO 2014/049577 and WO 2015/136458, for example, describes technological means that can be applied in producing such lenses and in controlling their focal properties.

Implementation of tunable spectacle lenses, however, requires solving a range of practical problems. For example, the phase modulation range—and hence the refractive power—of the lens is limited by the thickness and birefringence of the liquid crystal (or other electro-optical medium) that serves as the refractive medium. Therefore, to achieve a useful level of optical power (typically at least one diopter, and generally higher), it is desirable to drive the tunable lens to operate as a Fresnel lens, meaning that the phase modulation profile comprises an array of refractive bands bordered by abrupt phase steps. The refractive bands may have the form of rings; or, alternatively, the tunable lens may comprise two electro-optical layers, which are driven to operate as cylindrical Fresnel lenses (meaning that the refractive bands are linear), with mutually-perpendicular cylinder axes. In a static Fresnel lens, the refractive bands and phase steps typically have the form of curved or angled surfaces and ridges on the face of a solid refractive medium; whereas in an electrically-tunable Fresnel lens, the refractive bands and phase steps are defined by variations in the local index of refraction in the electro-optical medium, as determined by the voltage waveforms that are applied to the medium.

A Fresnel lens (whether static or tunable) will have good diffraction efficiency for wavelengths at which the phase steps between the refractive bands are approximately equal to an integer multiple of the wavelengths. In other words, a Fresnel lens with phase steps of height $\Delta\phi$ will have optimal efficiency at wavelengths $\lambda$ for which $\Delta\phi=2\pi N$ (wherein N is some integer). For practical values of $\Delta\phi$, there will generally be several wavelengths in the visible range for which diffraction efficiency is optimal: $\lambda_0$ for which $\Delta\phi=2\pi N$, $\lambda_1$ for which $\Delta\phi=2\pi(N+1)$, $\lambda_2$ for which $\Delta\phi=2\pi(N+2)$, etc. The high diffraction efficiency results in good performance of the Fresnel lens at these wavelengths, meaning that light at an object plane of the lens will be focused toward the corresponding image plane with a high modulation transfer function (MTF). Wavelengths in respective ranges close to these optimal values will similarly be focused with high MTF. At wavelengths in between these ranges of good lens performance, however, the diffraction efficiency of the Fresnel lens is reduced, resulting in substantially lower MTF and hence poor optical performance.

Thus, when a Fresnel lens is required to focus light over a broad spectral range, such as in typical ophthalmic use, the overall lens performance may be unsatisfactory, due to the low diffraction efficiency in the low-MTF regions. Embodiments of the present invention that are described herein address this problem by limiting the light passing through the Fresnel lens to the ranges in which the MTF is high or, additionally or alternatively, by adjusting the height of the phase steps to match certain spectral peaks of the incident light. The disclosed embodiments are directed particularly to the use of electrically-tunable Fresnel lenses in ophthalmic applications, but the principles of the present invention are similarly applicable to static Fresnel lenses, in both ophthalmic and other applications.

The term "height" is used in regard to phase steps in the present description and in the claims to mean the total phase shift at the abrupt phase steps of the Fresnel lens, which may be due to physical variations in the lens thickness in a static Fresnel lens or local variations in refractive index in a tunable Fresnel lens. This height can be expressed, for example, as a multiple N of a target wavelength $\lambda_0$, meaning that light at the target wavelength that is incident on one side of the phase step will experience a phase shift of $2\pi N$ relative to light that is incident on the other side.

In the disclosed embodiments, the abrupt phase steps between the refractive bands of a Fresnel lens have a height selected so as to focus light in two or more different wavelength ranges from an object plane toward an image plane with an MTF in excess of a predefined threshold, while focusing light in an intermediate wavelength range or ranges with MTF less than this threshold. (The threshold is determined, inter alia, by the performance requirements of the Fresnel lens.) In some embodiments, the Fresnel lens is dedicated to viewing a display, such as a virtual reality (VR) display, located at the object plane of the lens. In such embodiments, the display is configured to generate images that specifically include pixel colors within the wavelength ranges of high MTF. Pixel colors in the intermediate, low-MTF wavelength ranges are typically not included in the images. Either the phase steps of the Fresnel lens or the pixel color of the display, or both, may be chosen to give the desired wavelength match.

In other embodiments, when the Fresnel lens is used in a broadband light environment, a multi-band filter, such as a suitable multi-layer interference filter, is interposed between the object plane and the image plane of the Fresnel lens. The filter has passbands that overlap with the high-MTF wavelength ranges of the Fresnel lens, and a stopband in the intermediate, low-MTF wavelength range or ranges. (The terms "passband" and "stopband" are used in the context of the present description and in the claims to mean respective spectral ranges such that the transmittance of the filter for light in the passband is at least four times the transmittance for light in the stopband. For high lens performance, however, the ratio may be even higher: For example, the passband may have a transmittance of at least 90%, while the transmittance of the stopband is no more than 10%.)

When an interference filter is used in such applications, the passbands and stopbands will shift to shorter wavelengths as a function of increasing angle of incidence of light on the filter. To compensate for this filter shift, in some embodiments of the present invention the height of the abrupt phase steps of the Fresnel lens is graduated over the area of the Fresnel lens, so that the ranges of high diffraction efficiency, and thus high MTF, will shift along with the band shift of the filter.

System Configuration

Reference is now made to FIG. 1, which is a schematic sectional view of a tunable ophthalmic lens 20, in accordance with an embodiment of the invention. Lens 20 comprises a transparent envelope 26, which is configured to be mounted in a spectacle frame (not shown) and worn, in the spectacle frame, in front of an eye 22 of a user of the spectacles.

Envelope 26 in the present embodiment contains two optical phase modulators 40A and 40B, whose design and operation are described in greater detail hereinbelow. (These two optical phase modulators are similar in structure and principles of operation, and some of their properties are therefore described hereinbelow with reference to a generic "optical phase modulator 40"; and references to optical phase modulator 40 should be understood as applying to either or both of optical phase modulators 40A and 40B.) Optical phase modulators 40A and 40B are configured to operate as cylindrical Fresnel lenses, with respective cylinder axes that are mutually orthogonal. This mode of operation is illustrated in the insets, which show the respective phase modulation profiles of modulators 40A and 40B, comprising arrays of refractive bands 37 bordered by abrupt phase steps 39 between the bands.

The superposition of these two optical phase modulators 40A and 40B enables lens 20 to generate a specified phase modulation profile in an active area 24, which causes rays of optical radiation that are incident on the active area to converge or diverge with a specified focal power. In this manner, lens 20 can emulate or supplement the operation of a conventional static lens, but with the added features of changing its focal power dynamically, as well as shifting its optical center, for example between axes 28 and 30, in accordance with the movement of eye 22.

In an alternative embodiment (not shown in the figures), lens 20 comprises a single optical phase modulator, with electrodes configured so that the optical phase modulator can operate as a two-dimensional Fresnel lens, with focal power in both vertical and horizontal planes. (A Fresnel profile of this sort is shown in FIG. 15 of the above-mentioned WO 2015/136458.)

As can be seen in FIG. 1, active area 24 does not necessarily extend over the entire area of optical phase modulators 40A and 40B, but rather may cover only a smaller central region, surrounded by a peripheral region that is not optically active (although it may have some static optical power due to the shape of lens 20). For most ophthalmic applications, a limited active area of this sort is sufficient, covering between 4 and 10 $cm^2$ out of the total lens area. The remaining area of envelope 26 provides a wider field of view for peripheral vision, over which fine focus is not needed. Limiting the active area in this manner is useful in reducing the electrical complexity and power consumption of lens 20. Alternatively, active area 24 may extend over the entire area of the optical phase modulators.

Lens 20 focuses light from an object plane 35 toward an image plane 36—which in the current example is located at the retina of eye 22. (In other words, the Fresnel lens generated by optical phase modulators 40A and 40B provides one component of the total optical power, to which envelope 26 and the cornea and lens of eye 22 also contribute in the present instance.) In some embodiments, a display 32 is positioned at object plane 35, for example a virtual reality (VR) or augmented reality (AR) video screen, or any other suitable sort of display that is known in the art. Display 32 comprises an array of pixels 38a, 38b, 38c, 38d, . . . (collectively referred to a pixels 38), which emit light in certain pixel colors. To generate color images for projection toward eye 22, different pixels 38 may emit different pixel colors, for example in a Bayer-type mosaic display. Alternatively, all of the pixels may emit the same colors, with time-division multiplexing of the color, for example. In either case, the colors can be chosen to match the wavelength ranges in which optical phase modulators 40A and 40B have high MTF, as was explained above and will be detailed further hereinbelow.

Additionally or alternatively, lens 20 comprises a multi-band filter 34, having passbands that overlap with the wavelength ranges in which optical phase modulators 40A and 40B have high MTF, and stopbands in between and outside these ranges. Filter 34 can conveniently be contained inside envelope 26, as shown in FIG. 1. Alternatively, such a filter can be interposed in any suitable location between object plane 35 and image plane 36. Filter 34 may advantageously comprise a multi-layer interference filter, as described further hereinbelow; but other types of filters, such as absorption-based filters, may be used in addition to or instead of an interference filter.

Although FIG. 1 illustrates the use of both display 32 and filter 34 together, in other embodiments, lens 20 may be used with either display 32 or filter 34 individually.

Figure 2:
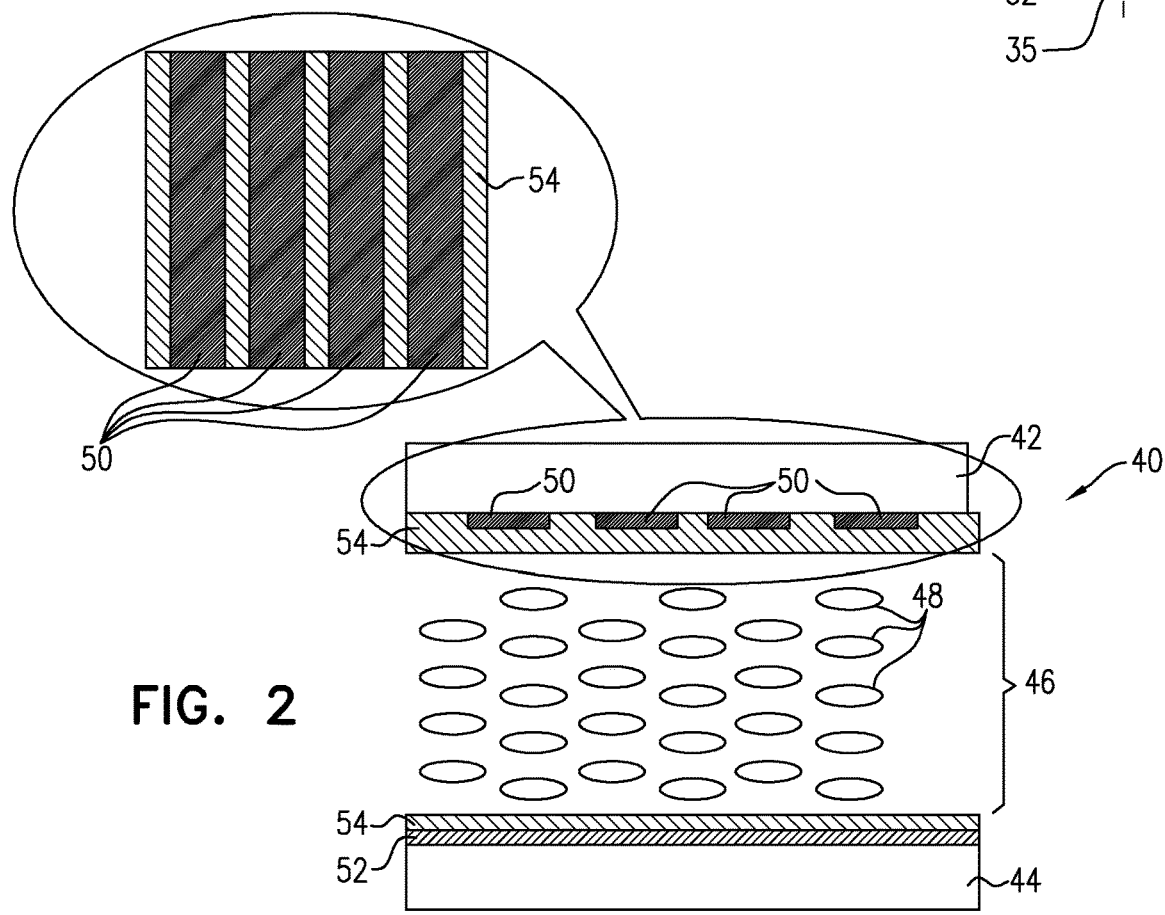
FIG. 2 is a schematic sectional view of an electrically-tunable optical phase modulator, in accordance with an embodiment of the invention.

FIG. 2 is a schematic sectional view of optical phase modulator 40, in accordance with an embodiment of the invention. Optical phase modulator 40 comprises an electro-optical layer 46, sandwiched between an upper substrate 42 and a lower substrate 44, which comprise a transparent material, for example, glass. Layer 46 comprises a liquid crystal material, which is typically contained by suitable encapsulation, as is known in the art. Substrates 42 and 44 can be coated on their insides with a polyimide alignment layer 54, which contains linear alignment structures in contact with layer 46, so as to cause liquid crystal molecules 48 to line up in a desired parallel orientation.

Conductive electrodes 50 and 52 are disposed over opposing first and second sides of electro-optical layer 46. Electrodes 50 and 52 comprise a transparent, conductive material, such as indium tin oxide (ITO), as is known in the art, which is deposited on the surfaces of substrates 42 and 44, respectively. (Alternatively, non-transparent excitation electrodes may be used, as long as they are thin enough so that they do not cause disturbing optical effects.) Although for the sake of visual clarity, only a few electrodes are shown in FIG. 2, in practice, for good optical quality, optical phase modulator 40 will typically comprise at least 100 stripe electrodes for excitation, and possibly even 400 or more.

Electrodes 50 in the pictured embodiment are arranged as an array of parallel stripes. On the opposite side of layer 46, electrodes 52 may comprise stripes perpendicular to electrodes 50, which enable control circuitry (not shown in the figures) to apply two-dimensional voltage patterns across layer 46. Alternatively, electrode 52 may comprise a uniform layer on substrate 44, defining a common electrode capable of serving as an electrical ground plane. In this latter case, only one-dimensional voltage patterns can be applied across layer 46, which can be used to create phase modulation profiles equivalent to cylindrical lenses, and specifically cylindrical Fresnel lenses in the present instance. As noted above, two such optical phase modulators 40A and 40B in series, with electrodes 50 oriented orthogonally one to the other, can be used in lens 20 to generate two-dimensional optical modulation patterns.

Due to the behavior of liquid crystal molecules 48, electro-optical layer 46 has an effective local index of refraction at any given location within the active area of the layer that is determined by the voltage waveform that is applied across the electro-optical layer at that location. The control circuitry applies appropriate control voltage waveforms to the electrodes so as to modify the optical phase modulation profile of the electro-optical layer 46. When used in spectacles, such as in lens 20, the phase modulation profile is chosen to cause rays of optical radiation that are incident on optical phase modulator 40 to converge or diverge with a desired focal power. In the present embodiment, the phase modulation profile comprises a Fresnel profile.

Further details of a variety of electrode structures that can be used in electrically-tunable lenses, as well as the control voltage waveforms that may be applied to such electrodes in order to generate various sorts of phase modulation profiles, are described in the above-mentioned WO 2014/049577. These details are omitted here for the sake of brevity.

Matching Between Fresnel and Display Wavelengths

Figure 3:
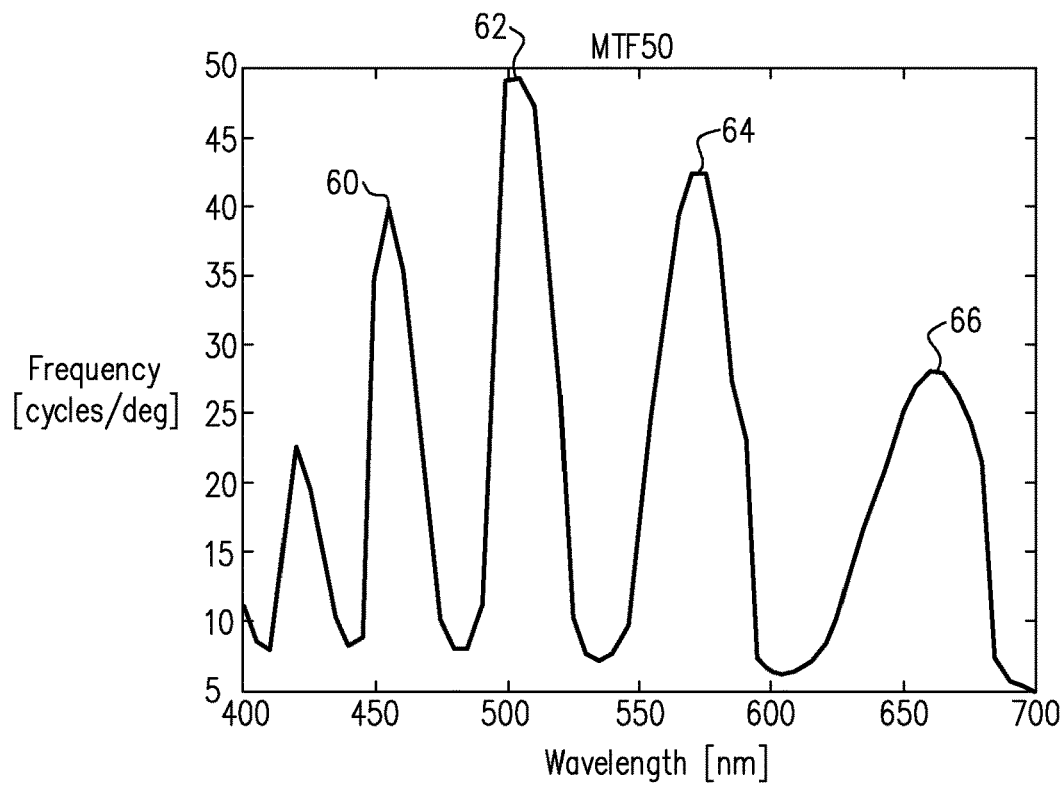
FIG. 3 is a schematic plot of modulation transfer function (MTF) as a function of wavelength for a Fresnel lens, in accordance with an embodiment of the invention.

FIG. 3 is a schematic plot of MTF computed as a function of wavelength for a Fresnel lens, in accordance with an embodiment of the invention. Specifically, this plot shows the value of "MTF50," meaning the spatial frequency (in cycles/degree) at which the MTF drops to 50% of its maximal, low-frequency value. The Fresnel lens in this case has phase steps between its refractive bands of N=7 for a base wavelength $\lambda_0$=500 nm (meaning that the height of the phase steps is $14\pi$ at $\lambda_0$, which is equivalent to an effective optical path difference of 3.5 µm). Similar plots may be generated for substantially any size of the phase steps, either larger or smaller. In the description that follows, this MTF plot is assumed to apply to a tunable Fresnel lens generated by optical phase modulators 40 (FIG. 1); but the principles of this embodiment may similarly be applied, mutatis mutandis, to other types of Fresnel lenses, both tunable and fixed.

As shown in FIG. 3, the MTF in this example has peaks 60, 62, 64 and 66 at wavelengths of 455 nm, 505 nm, 575 nm and 665 nm, due to high diffraction efficiency and concomitantly low scatter of the Fresnel lens at these wavelengths (taking into account the varying refractive index as a function of wavelength). The value of MTF50 at all of these wavelengths is greater than a threshold value of 25 cycles/degree. In the wavelength ranges between these peaks, the value of MTF50 is below this threshold value.

Display 32 (FIG. 1) can be designed to accommodate these peaks, by matching the pixel colors of the display to two or more of peaks 60, 62, 64 and 66, while avoiding pixel colors in the ranges of low MTF between the peaks. For example, if pixels 38a, 38b, 38c, 38d are overlaid by a color filter array, the filters may be chosen to match the peaks in the MTF. Additionally or alternatively, the pixel colors may be provided by narrowband light sources, such as light-emitting diodes (LEDs) of different colors, that emit at or near the MTF peaks. It is also possible to shift the MTF peaks to match the display colors, by increasing or decreasing the heights of the phase steps in the Fresnel lens.

Figure 4:
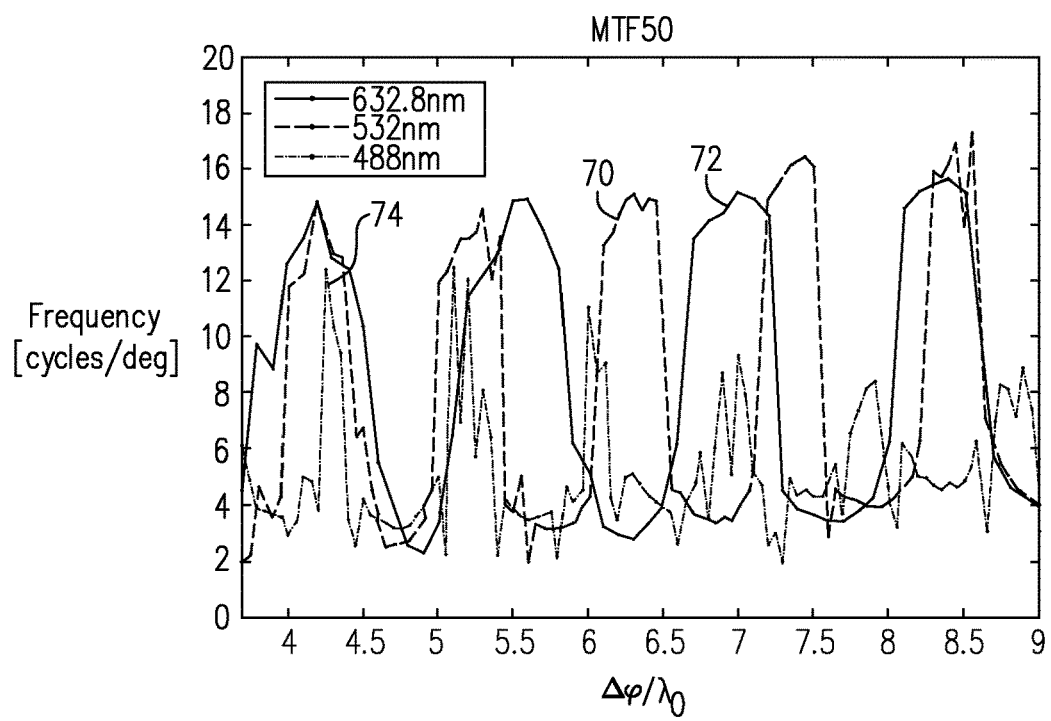
FIG. 4 is a schematic plot of MTF for three different wavelengths as a function of phase step height of a Fresnel lens, in accordance with an embodiment of the invention.

FIG. 4 is a schematic plot of MTF for three different wavelengths as a function of phase step height of a Fresnel lens, in accordance with an embodiment of the invention. In this case, the value of MTF50 was measured for light filtered through three different bandpass filters as the phase step height $\Delta\phi$ was varied, by changing the electrical potentials applied to a tunable Fresnel lens, such as the lens produced by optical phase modulators 40. Curves 70, 72 and 74 represent the values of MTF50 that were measured using filters centered at 532 nm, 632.8 nm and 488 nm, respectively. The phase step height, $\Delta\phi=2\pi N$ for $\lambda_0=530$ nm, was varied over the range from N=3.5 to N=9.

As expected, each of curves 70, 72 and 74 has peaks at different phase step values, due to the varying diffraction efficiency of the Fresnel lens for the different wavelengths. All three curves, however, show high MTF at a value of N=4.25. Thus, assuming display has pixel colors that are preset to wavelengths near 532 nm, 632.8 nm and 488 nm, respectively, the phase step height of optical phase modulators 40 can be set so that the MTF is above a predefined threshold for all of the pixel colors. For other choices of display colors, a different value of N can be found that will give optimal performance.

Alternatively, when display 32 generates broadband light and/or additional spectral peaks that do not fall within high-MTF ranges of the Fresnel lens, filter 34 or other filters external to lens 20 (not shown in the figures) can be used to block light that is outside the high-MTF ranges of the Fresnel lens.

Matching Between Fresnel and Filter Wavelengths

Figure 5:
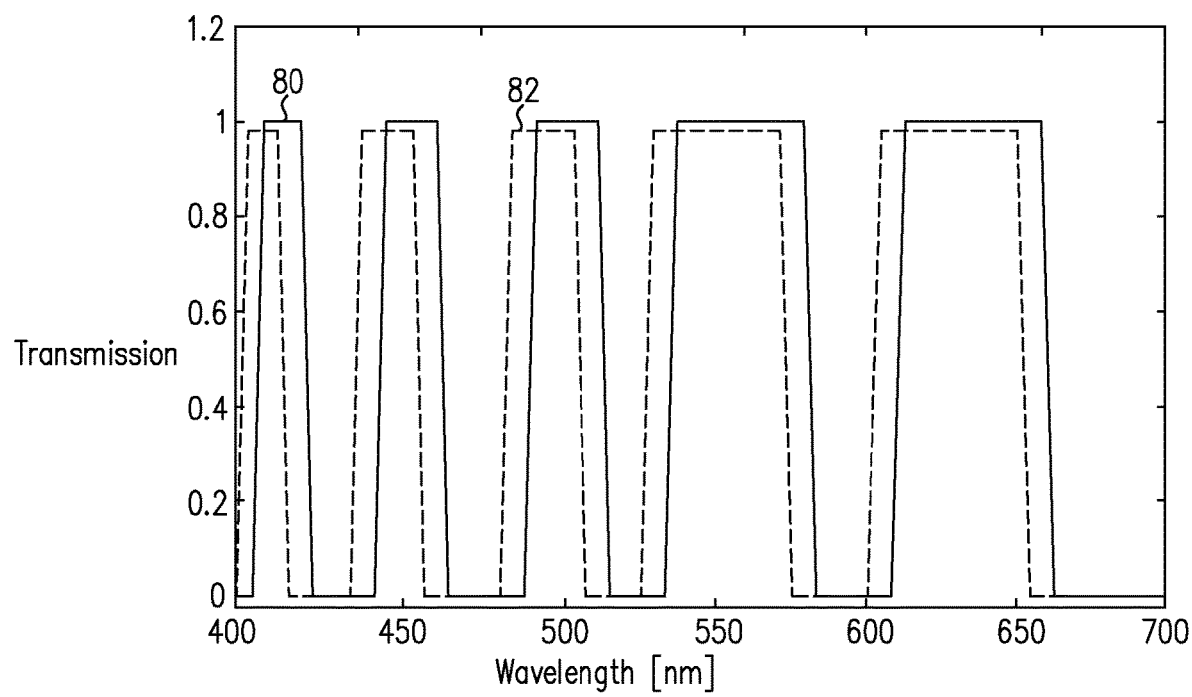
FIG. 5 is a schematic plot of optical transmission as a function of wavelength for a multi-band filter, in accordance with an embodiment of the invention.
Figure 6:
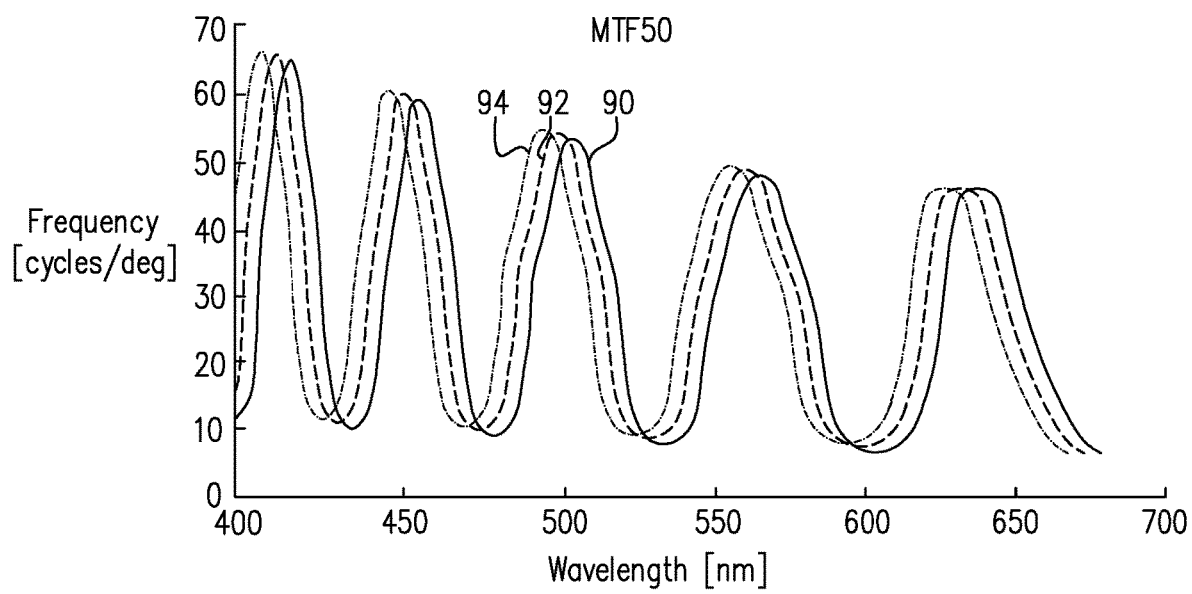
FIG. 6 is a schematic plot of MTF as a function of wavelength for three different phase step heights of a Fresnel lens, in accordance with an embodiment of the invention.

Reference is now made to FIGS. 5 and 6, which schematically illustrate another embodiment of the invention, in which the passbands of multi-band filter 34 and the high-MTF wavelength ranges of the Fresnel component of lens 20 (FIG. 1) are chosen so as to overlap. FIG. 5 is a schematic plot of optical transmission as a function of wavelength for multi-band filter 34, while FIG. 6 is a schematic plot of MTF as a function of wavelength for three different phase step heights of lens 20. This embodiment, too, is described with reference to the elements of FIG. 1 for the sake of convenience and clarity; but the principles of this embodiment may be applied, mutatis mutandis, to other types of Fresnel lenses, of both fixed and tunable types.

The alternating passbands and stopbands of filter 34 for rays of light at normal incidence are illustrated by a curve 80 in FIG. 5. Interference filters offering this sort of performance are available, for example, from Chroma Technology Corporation (Bellows Falls, Vt.). In practice, however, it is not necessary that filter 34 have such sharp band edges and such strong rejection of light in the stopbands, as long as the passbands and stopbands of the filter overlap with the corresponding high- and low-MTF wavelength ranges of lens 20. For example, filter 34 may comprise a suitable absorption filter or a combination of interference- and absorption-filter components. Although the stopbands in curve 80 reject nearly all light in the low-MTF ranges of lens 20, when Fresnel spectacles are to be used in conditions of weak, broadband illumination, it may be desirable to select or adjust filter 34 so that it passes a relatively higher fraction of the light in the low-MTF ranges in order to increase light throughput, even at the expense of reduced image contrast.

In FIG. 6, curves 90, 92 and 94 show the variation of MTF50 with wavelength for different heights of the phase steps in Fresnel lens 20. For phase steps $\Delta\phi=2\pi N$, as defined above, with $\lambda_0=500$ nm, curve 90 corresponds to phase steps of N=10; curve 92 to N=9.9; and curve 94 to N=9.8. These curves illustrate that the high-MTF bands of the Fresnel lens can be adjusted to match the passbands of filter 34 by changing the size of the phase steps.

As noted above, curve 80 in FIG. 5 illustrates the performance of an interference filter at normal incidence. Referring back to FIG. 1, however, it can be seen that light rays to be focused by lens 20 into eye 22 will be incident on filter 34 over a range of angles of incidence. Rays close to axis 30 will be incident at or near normal incidence, while peripheral rays (i.e., rays incident on filter 34 and optical phase modulators 40 at locations far from axis 30) will be incident at much higher angles. In a spectacle lens, such as lens 20, with an active area 24 of diameter 30 mm, the angle of incidence across the filter and optical phase modulators will typically vary by more than ±20°.

The increase in angle of incidence results in a shift of the passbands of filter 34 to shorter wavelength, as illustrated by a curve 82 in FIG. 5. A comparison to the curves in FIG. 6 shows that a comparable shift occurs in the wavelength ranges of high MTF with decreasing phase step size. The correlation between the angle-related shift in filter passband and the step-size-related shift in MTF can be used in maintaining the desired overlap between passbands and high MTF over a wide range of angles, and thus over the entire active area 24 of lens 20.

Figure 7:
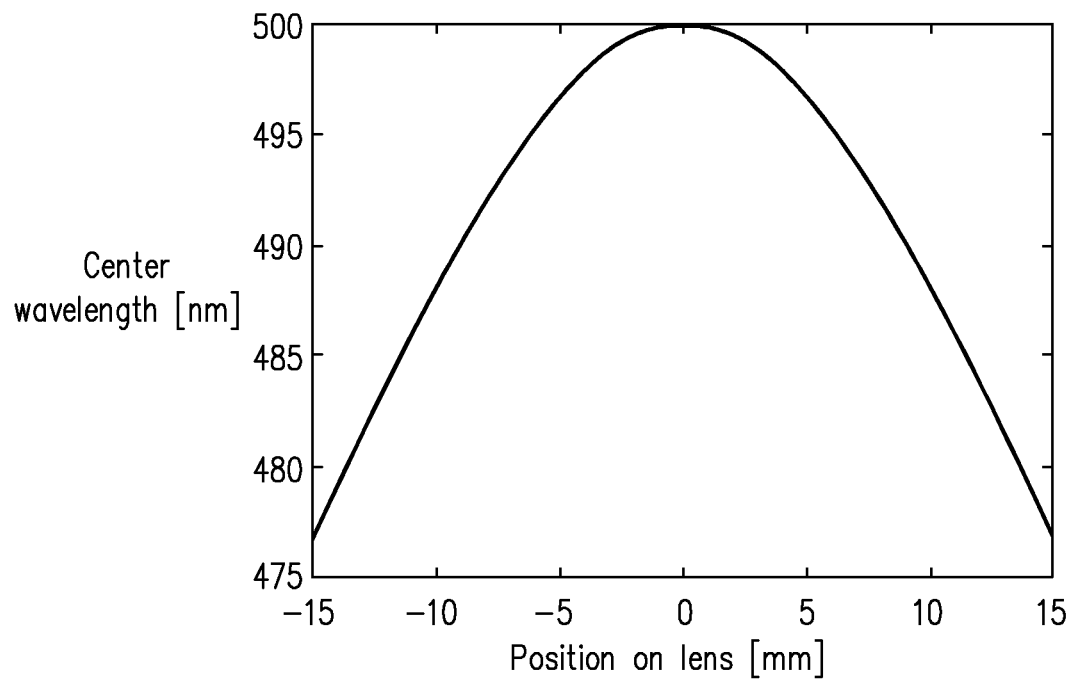
FIG. 7 is a schematic plot of the shift in the center wavelength of the passband of an interference filter as a function of the position of incidence of light rays on the interference filter, in accordance with an embodiment of the invention.

FIG. 7 is a schematic plot showing the shift in the center wavelength of the passband of filter 34 in lens 20 as a function of the position of incidence of light rays on the filter, in accordance with an embodiment of the invention. This plot assumes that filter 34 comprises an interference filter, with a passband centered, by way of example, at 500 nm for rays at normal incidence. The center of the passband shifts to the blue by more than 20 nm over a range of ±15 mm.

Figure 8:
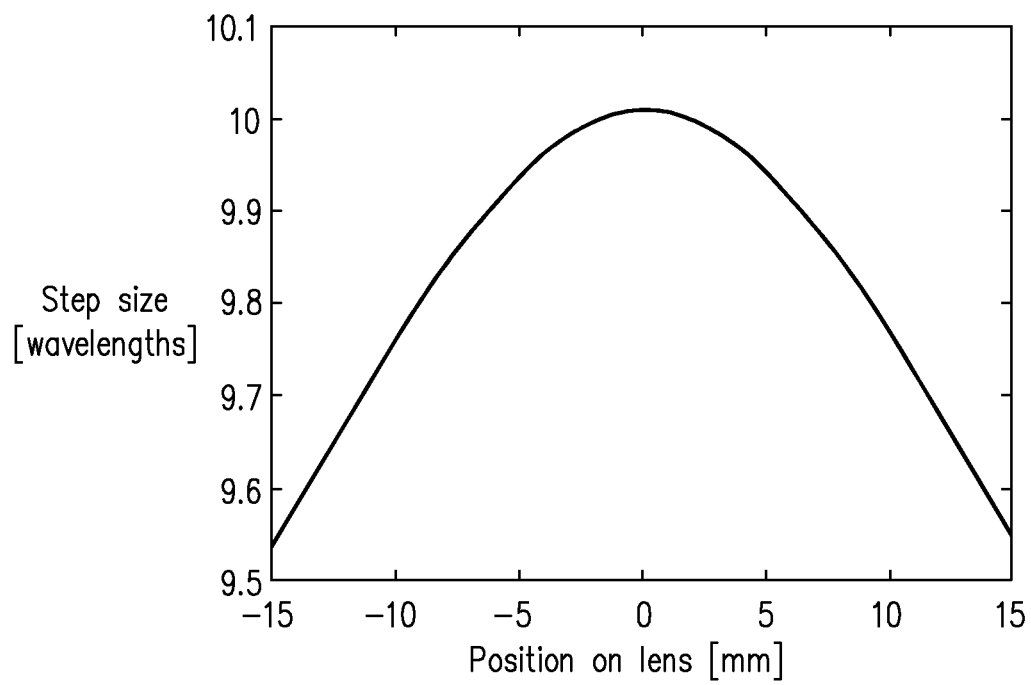
FIG. 8 is a schematic plot showing the optimal phase step size for a Fresnel lens as a function of the position of incidence of light rays on the lens, in accordance with an embodiment of the invention.

FIG. 8 is a schematic plot showing the optimal phase step size for optical phase modulators 40A, 40B in lens 20 as a function of the position of incidence of light rays on the lens, in accordance with an embodiment of the invention. This plot is based on the shift in the regions of high MTF with the phase step height that is illustrated by curves 92 and 94 in FIG. 6. FIG. 8 shows that in order to match the blue shift of the center of the filter passband with increasing angle of incidence, the sizes of the phase steps of the Fresnel lens should decrease from a maximal value (N=10) in the center of lens 20 to a smaller value (N=9.5) at the edges of active area 24.

Figure 9:
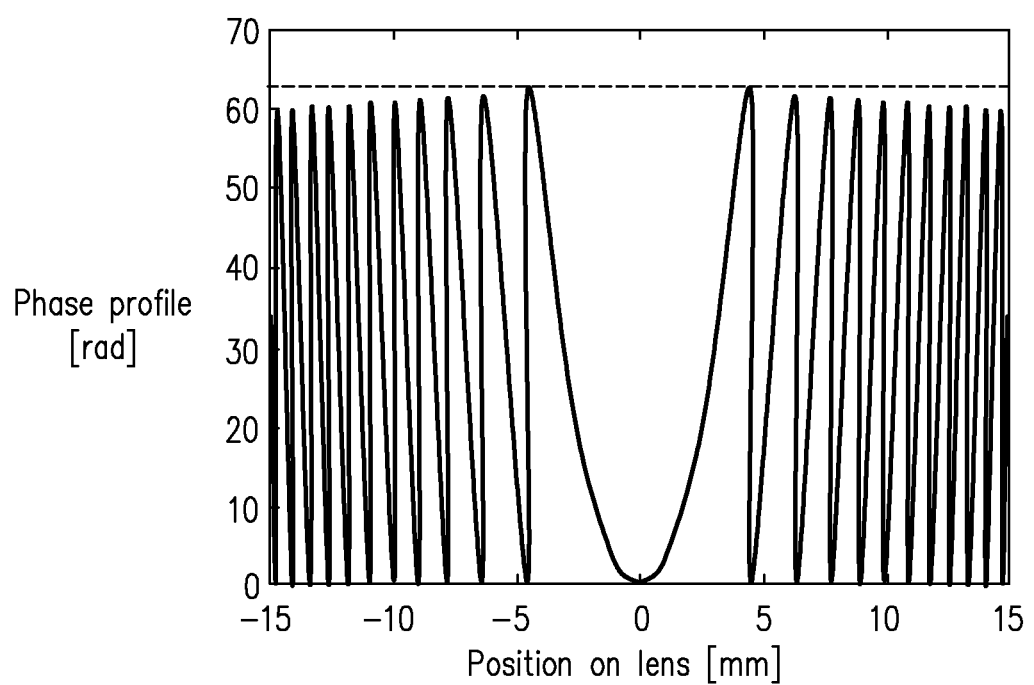
FIG. 9 is a schematic sectional view of the phase profile of a Fresnel lens having variable phase step sizes, in accordance with an embodiment of the invention.

FIG. 9 is a schematic sectional view of the phase profile of a Fresnel lens having variable phase step sizes across its active area, in accordance with an embodiment of the invention. The phase profile may be physical, as in a static Fresnel lens, or it may be generated by local changes in refractive index due to applied electrical potentials, as in optical phase modulators 40A, 40B in lens 20. The phase profile is shown in FIG. 9 in radians, meaning that the height of the phase steps at wavelength $\lambda_0$ is $2\pi N$. Thus, in a central part of the lens, N=10, decreasing to about N=9.5 in the peripheral parts, as indicated by FIG. 8.

In consequence of the graduated phase steps, the ranges of maximal MTF of lens 20 will follow curve 90 near the center of active area 24 and curves 92 and 94 with increasing distance from the center, corresponding to the shift of filter passband that is illustrated in FIG. 7. Although FIGS. 5-9 relate, for the sake of concreteness and clarity, to a particular lens geometry and range of Fresnel phase steps, the principles of this embodiment may similarly be applied, mutatis mutandis, to other filter band structures and Fresnel lens characteristics.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
a Fresnel lens, comprising an electro-optical medium and electrodes configured to apply varying electrical potentials across the electro-optical medium so as to adjust focal properties of the Fresnel lens by defining an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold; and
a display configured to generate, at the object plane of the Fresnel lens, an image including first and second pixel colors within the first and second wavelength ranges, respectively.

2. The apparatus according to claim 1, wherein the image generated by the display does not have any pixel colors within the third wavelength range.

3. The apparatus according to claim 1, wherein the electrodes comprise comprise parallel conductive stripes extending along respective, mutually-parallel axes across at least a first side of the electro-optical medium.

4. The apparatus according to claim 1, wherein the electro-optical medium comprises a liquid crystal.

5. The apparatus according to claim 1, wherein the varying electrical potentials are adjustable so as to match the first and second wavelength ranges to the first and second pixel colors.

6. The apparatus according to claim 1, wherein the first and second pixel colors are selected to match the first and second wavelength ranges.

7. The apparatus according to claim 1, wherein the display comprises at least first pixels configured to emit light of the first pixel color and second pixels configured to emit light of the second pixel color.

8. Optical apparatus, comprising:
a Fresnel lens, comprising an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold; and
a display configured to generate, at the object plane of the Fresnel lens, an image including first and second pixel colors within the first and second wavelength ranges, respectively,
wherein the height of the phase steps is selected so that the Fresnel lens further focuses light in a fourth wavelength range with MTF in excess of the predefined threshold, wherein the fourth wavelength range is separated from the first and second wavelength ranges by another range with MTF less than the predefined threshold, and wherein the image generated by the display comprises a third pixel color within the fourth wavelength range.

9. Optical apparatus, comprising:
a Fresnel lens, comprising an electro-optical medium and electrodes configured to apply varying electrical potentials across the electro-optical medium so as to adjust focal properties of the Fresnel lens by defining an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold; and
a multi-band filter interposed between the object plane and the image plane and having first and second passbands, which overlap respectively with the first and second wavelength ranges, and a stopband intermediate the first and second passbands, overlapping with the third wavelength range.

10. The apparatus according to claim 9, wherein the multi-band filter comprises a multi-layer interference filter.

11. The apparatus according to claim 10, wherein the height of the phase steps is graduated over an area of the Fresnel lens responsively to a shift of the first and second passbands with an angle of incidence of the light on the multi-layer interference filter.

12. The apparatus according to claim 11, wherein the height of the phase steps is greater in a central part of the Fresnel lens than in a peripheral part of the Fresnel lens.

13. The apparatus according to claim 9, wherein the electrodes comprise parallel conductive stripes extending along respective, mutually-parallel axes across at least a first side of the electro-optical medium.

14. The apparatus according to claim 9, wherein the electro-optical medium comprises a liquid crystal.

15. The apparatus according to claim 9, wherein the varying electrical potentials are adjustable so as to match the first and second wavelength ranges to the first and second passbands.

16. The apparatus according to claim 9, wherein the first and second passbands are selected to match the first and second wavelength ranges.

17. An optical method, comprising:
providing an electro-optical medium and electrodes configured to apply varying electrical potentials across the electro-optical medium;
driving the electrodes to define a Fresnel lens, comprising an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold; and generating, at the object plane of the Fresnel lens, an image including first and second pixel colors within the first and second wavelength ranges, respectively.

18. The method according to claim 17, wherein the generated image does not include any pixel colors within the third wavelength range.

19. The method according to claim 17, wherein the electrodes comprise parallel conductive stripes extending along respective, mutually-parallel axes across at least a first side of the electro-optical medium.

20. The method according to claim 17, wherein the electro-optical medium comprises a liquid crystal.

21. The method according to claim 17, wherein driving the electrodes comprises adjusting the electrical potentials so as to match the first and second wavelength ranges to the first and second pixel colors.

22. The method according to claim 17, wherein generating the image comprises selecting the first and second pixel colors to match the first and second wavelength ranges.

23. The method according to claim 17, wherein generating the image comprises providing a display comprising at least first pixels configured to emit light of the first pixel color and second pixels configured to emit light of the second pixel color.

24. The method according to claim 17, wherein providing the Fresnel lens comprises selecting the height of the phase steps so that the Fresnel lens further focuses light in a fourth wavelength range with MTF in excess of the predefined threshold, wherein the fourth wavelength range is separated from the first and second wavelength ranges by another range with MTF less than the predefined threshold, and wherein the generated image comprises a third pixel color within the fourth wavelength range.

25. An optical method, comprising:
providing an electro-optical medium and electrodes configured to apply varying electrical potentials across the electro-optical medium;

driving the electrodes to define a Fresnel lens, comprising an array of refractive bands bordered by abrupt phase steps of a height selected so as to focus light in different, first and second wavelength ranges from an object plane toward an image plane with a modulation transfer function (MTF) in excess of a predefined threshold, while focusing light in a third wavelength range, intermediate the first and second wavelength ranges, with MTF less than the predefined threshold; and interposing between the object plane and the image plane a multi-band filter having first and second passbands, which overlap respectively with the first and second wavelength ranges, and a stopband intermediate the first and second passbands, overlapping with the third wavelength range.

26. The method according to claim 25, wherein the multi-band filter comprises a multi-layer interference filter.

27. The method according to claim 26, wherein providing the Fresnel lens comprises graduating the height of the phase steps over an area of the Fresnel lens responsively to a shift of the first and second passbands with an angle of incidence of the light on the multi-layer interference filter.

28. The method according to claim 27, wherein the height of the phase steps is greater in a central part of the Fresnel lens than in a peripheral part of the Fresnel lens.

29. The method according to claim 25, wherein the electrodes comprise parallel conductive stripes extending along respective, mutually-parallel axes across at least a first side of the electro-optical medium.

30. The method according to claim 25, wherein the electro-optical medium comprises a liquid crystal.

31. The method according to claim 25, wherein driving the electrodes comprises adjusting the electrical potentials so as to match the first and second wavelength ranges to the first and second passbands.

32. The method according to claim 25, wherein interposing the multi-band filter comprises selecting the first and second passbands to match the first and second wavelength ranges.

* * * * *